(12) United States Patent
Dahl et al.

(10) Patent No.: US 6,302,058 B1
(45) Date of Patent: Oct. 16, 2001

(54) APPARATUS AND METHOD FOR PRODUCING A FOAM BOVINE TEAT DIP

(75) Inventors: Janet F. Dahl, Oshkosh; Dennis L. Edison, Fall Creek; Paul E. Fowler; Michael R. Stettler, both of Oshkosh, all of WI (US)

(73) Assignees: North West Environmental Systems, Inc., Oshkosh; Pro Chemicals, Inc., Green Bay, both of WI (US)

( * ) Notice: Subject to any disclaimer, the term of this patent is extended or adjusted under 35 U.S.C. 154(b) by 0 days.

(21) Appl. No.: 09/406,040

(22) Filed: Sep. 27, 1999

(51) Int. Cl.[7] .................................................... A01J 7/04
(52) U.S. Cl. ........................................ 119/14.47; 119/670
(58) Field of Search ............................... 119/14.47, 604, 119/603, 651, 670, 673, 652

(56) References Cited

U.S. PATENT DOCUMENTS

| | | | |
|---|---|---|---|
| 2,532,088 | * | 11/1950 | Cordis . |
| 3,713,423 | * | 1/1973 | Sparr, Sr. ................................. 119/670 |
| 3,828,776 | * | 8/1974 | Sparr, Sr. ................................. 604/310 |
| 3,874,561 | * | 4/1975 | Zackheim et al. .................... 222/207 |
| 3,917,119 | * | 11/1975 | Kahn ..................................... 222/108 |
| 3,921,860 | * | 11/1975 | Zackheim ............................. 222/207 |
| 4,305,346 | * | 12/1981 | Sparr, Sr. ............................. 119/670 |
| 4,970,992 | * | 11/1990 | Aiken ................................... 119/673 |
| 5,269,444 | * | 12/1993 | Wright ................................. 222/190 |
| 5,379,724 | * | 1/1995 | Dee et al. . |
| 5,535,700 | * | 7/1996 | Boudreau ............................. 119/651 |
| 5,722,350 | * | 3/1998 | Marshall .............................. 119/673 |
| 5,776,479 | * | 7/1998 | Pallos et al. ......................... 424/406 |

* cited by examiner

Primary Examiner—Charles T. Jordan
Assistant Examiner—Yvonne R Abbott
(74) Attorney, Agent, or Firm—Willie Krawitz

(57) ABSTRACT

An apparatus and method for producing a foam surfactant suitable for a bovine teat dip comprises air pressurization of a surfactant solution containing a germicide, disinfectant, biocide, etc., passing the air-surfactant mixture through a flow or line mixer to a foam holding cup adjacent the teat area and expanding the mixture in the holding cup to produce an adherent surfactant foam product with reduced run off, which both protects and reduces infection of the teat and surrounding udder area.

10 Claims, 2 Drawing Sheets

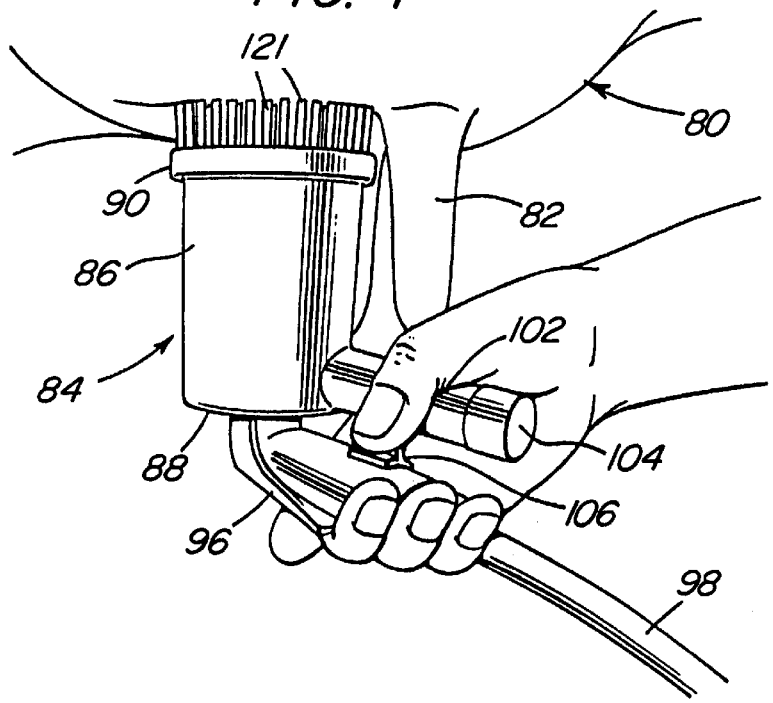
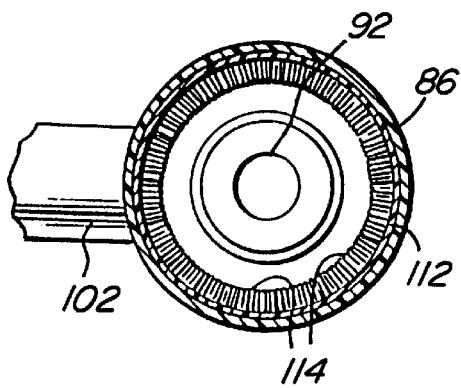
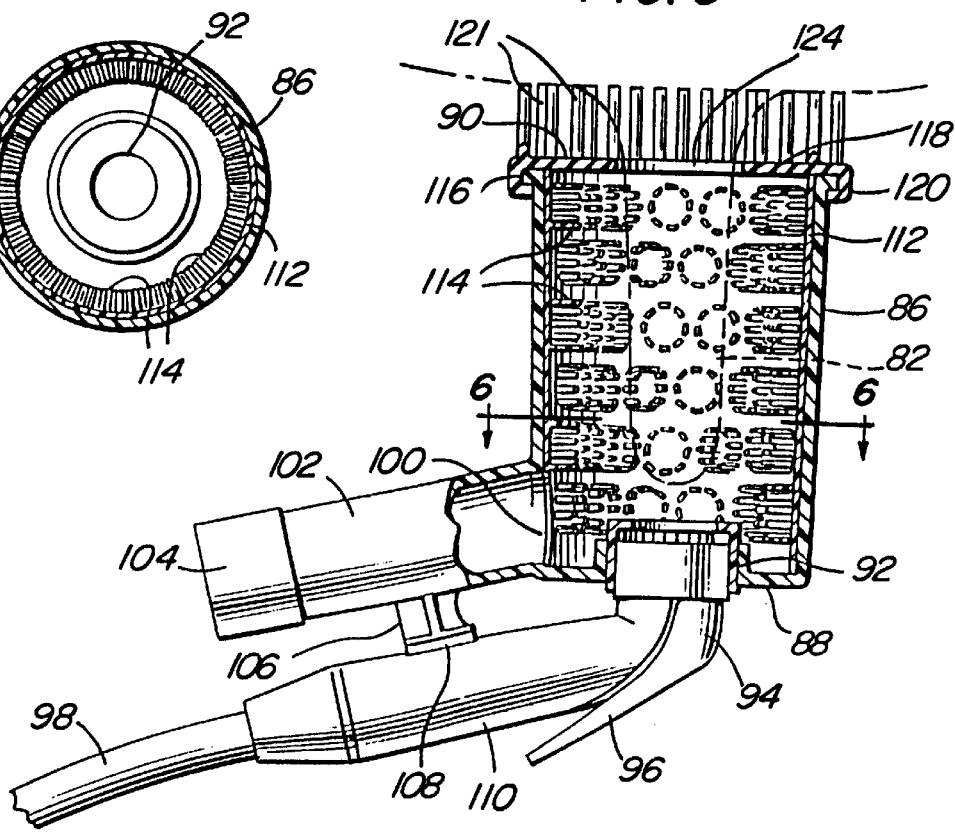

APPARATUS AND METHOD FOR PRODUCING A FOAM BOVINE TEAT DIP

BACKGROUND OF THE INVENTION

This invention relates to a new and improved apparatus and method for producing a foam surfactant containing a biocide, germicide, disinfectant, etc., as a bovine teat dip.

Surfactant liquids and applicators are well known for use as bovine teat dips, and typical publications concerning these applicators are found in U.S. Pat. Nos. 3,713,423 and 4,305,346. Publications concerning bovine teat dips include U.S. Pat. Nos. 5,534,266 and 5,720,984 the latter patent disclosing a non-ionic, laureth (11–16) carboxylic acid surfactant teat dip and hand foam which is highly suitable for use in this invention. Publications concerning bovine teat dip formulations are U.S. Pat. Nos. 3,728,449; 4,012,504; 4,049,830; 4,759,931; 5,529,770; 5,641,498; 5,368,868; 5,534,266; 5,616,348; 5,651,977; and 5,720,984. Polyethenoxy detergents and $I_2$ are disclosed in an article by Benjamin Carroll in the Journal of Bacteriology, 69: 413–417, (1955). A PVP surfactant for a teat dips is also suitable, and so is one sold by Norman Fox & Co. under the trade name of NORFOX N-P9, and listed in "McCutcheon's Emulsifiers and Detergents", 1989 (incorporated herewith) specifically for use with iodophors. Other types of teat dips are sold as Klenzade™ Teat Guard containing a nonyl phenoxypolyethoxy ethanol surfactant and titratable iodine. U.S. Pat. No. 5,616,348 supra, discloses a polyethoxylated polyoxypropylene block copolymer (Poloxamer) and iodine which is suitable as a bovine teat dip.

It would be highly desireable to provide a foamed bovine teat dip which would cover the outer teat area, and provide protection to the teat canal when the teat sphincter is open following a milking procedure, when the teat canal is exposed and highly vulnerable to immediate infection. Even when the teat sphincter has closed, it would still be desireable to prevent infection from reaching the area of the teat opening, and the teat area in general with reduced run off.

This would enable the foam to adhere to and remain in close and protective contact with the teat. Further, it is desired to provide an apparatus with the capability of producing foam using a wide variety of surfactants, such as those disclosed, supra.

U.S. Pat. Nos. 3,713,423 and 4,305,346 describe an apparatus which coats a bovine teat area with fine mist, but these patented devices are hand operated and do not produce any foam, let alone a foam fulfilling the above protective characteristics. It will also be appreciated that use of foam reduces the amount of surfactant used for a bovine teat dip by about one-half compared to either a spray or liquid dip, and hence an improvement in the operation of these two patents would be desirable.

THE INVENTION

According to the invention, there is provided an apparatus and method for producing a foam for a bovine teat dip comprising pressurizing a surfactant in a container with air, feeding the compressed air and surfactant to a flow or line mixer, and expanding the air and surfactant from the mixer through an orifice and into a container cup surrounding the teat and adjacent udder area, thereby forming a new and improved surfactant biocide foam which adheres to the teat, with reduced run off.

BRIEF DESCRIPTION OF THE DRAWINGS

FIG. 4 is a fragmentary, perspective view of a cow udder with the milk 'let down' stimulating apparatus of the instant invention operatively associated therewith;

FIG. 5 is an enlarged, fragmentary side elevation view of FIG. 4 and with major portions being broken away and illustrated in vertical section; and, FIG. 6 is a horizontal sectional view taken along lines 6—6 of FIG. 4.

BRIEF DESCRIPTION OF THE PREFERRED EMBODIMENTS

Figure 1:
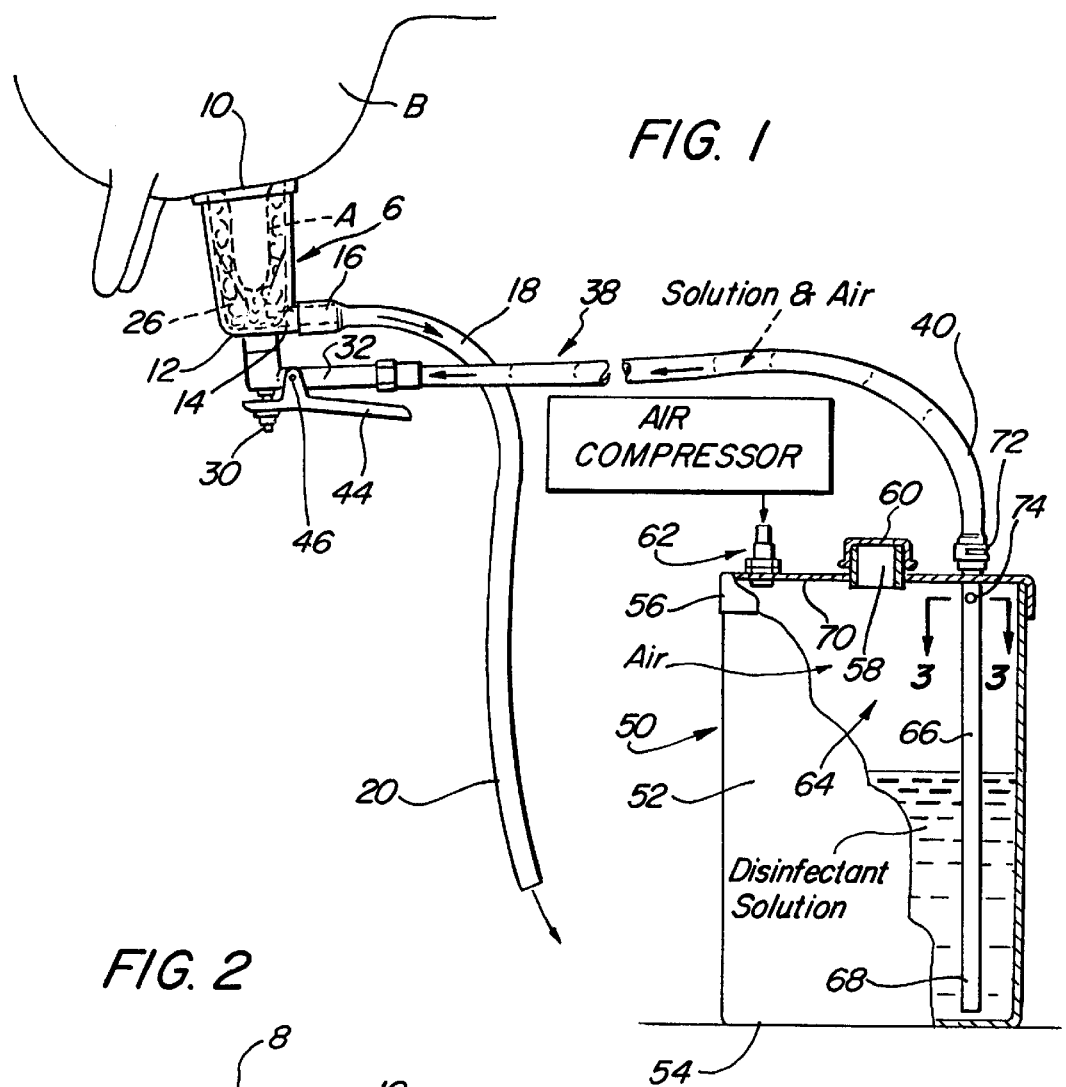
FIG. 1 is a view of the overall apparatus as set up for use, and showing how it is used and constructed and illustrating in section various parts of a tank for containing a solution of surfactant.
Figure 2:
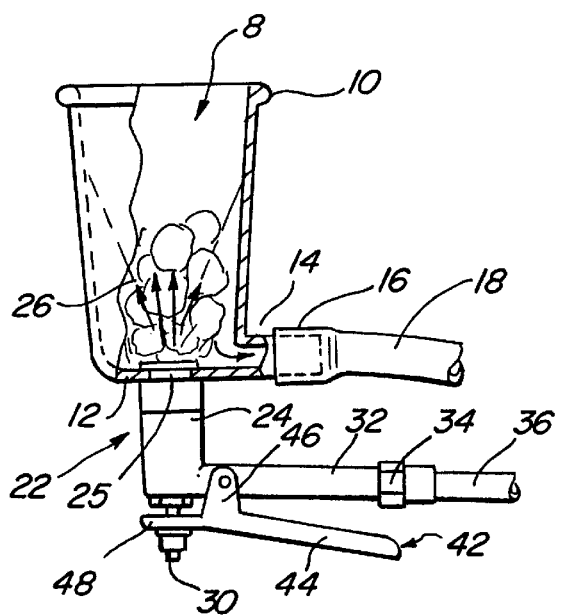
FIG. 2 is an enlarged view of parts in section and elevation detailing the container cup and component parts associated therewith.

A teat cup 6 is shown in FIGS. 1 and 2 is provided with the required depth and cross sectional dimension to accommodate a teat A on an udder B. The teat cup 6 has an open top or mouth portion 8 and surrounded by a suitable udder contacting bead 10. This beaded mouth adapts to the required contact with the part of the udder immediately encompassing the teat A. The bottom of the cup 12 is provided on one side with a laterally projecting drainage or emptying neck 14, and an end portion 16 of a drainage and fluid disposal hose 18 detachably secured thereto. The discharge end 20 of the fluid disposal hose may be placed in a collecting device (not shown) or discharged to sewage, or in the case of foam, the emptying neck 14 may be closed off entirely. The bottom portion of the cup is provided with a valve 22 having a body 24 depending below the bottom 12 of the cup. The upper end of the valve leads to an inlet fluid expansion bore 25 (about 1" in diameter) at the bottom of the cup, and when a pressurized mixture of air (or $CO_2$, $N_2$, etc.) and surfactant enters this expansion bore the mixture will expand from an initial pressurized value down to atmospheric or ambient pressure, and hence become a foam 26 in the cup, thereby making adhering contact with the teat and surrounding udder.

The valve body 22 provides an intake line coupling 32 having a suitable bore, and which controls the on-off delivery of disinfectant surfactant to valve body 24, the line coupling being connected through a coupling 34 to a flow and line mixer 38 which supplies surfactant under pressure to the cup 6 to produce foam 26. A useful internal line diameter of the line mixer 38 is about ¼", and employing pressure conditions, as detailed infra, a useful length of the mixer line 38 should be between 20–30 feet.

The intake line coupling 32 also serves as a gripping member and carries a manually trippable lever 42. The lever is provided with a handle portion 44 suitably shaped opposed to the line coupling 32 and having ears 46 straddling and pivotally connected to the coupling; the lever has a fork 48 connected with the line coupling 32 for opening and closing the valve.

A tank 50 having a sidewall 52 and bottom 54 is provided for containing disinfectant surfactant for supply to the teat cup 6. A flanged cover 56 and cap 60 is mounted centrally of the tank through which the tank can be filled, and a valve 62 functions to connect with a supply of air pressure governed by an air regulator (not shown) for pressuring air into the interior of the tank 64.

Figure 3:
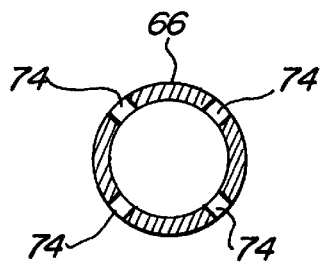
FIG. 3 is a cross section on a slightly enlarged scale taken approximately on the plane of the section line 3—3 of FIG. 1.

A liquid lifting pipe 66 extending from line 38 has an inlet 68 near the bottom of the tank, the lifting pipe being connected by a clamp 72 to the line 38. Preferably, the inlet 68 has a restricted opening or is otherwise provided with a restrictor (not shown) to prevent excessive intake of surfactant. A plurality e.g., four orifices 74 about 1/16" in diameter (shown in FIG. 3) are formed on the lifting pipe 66 to provide for adequate mixing of air and surfactant, thereby producing a drier foam and also reducing the consumption of surfactant.

Compressed air is supplied at an air pressure of about 20–50 psi through the intake valve 62 and fed into the space 64 of the tank 50. The compressed air compresses surfactant into the inlet 68 of the lifting pipe 66. Also, compressed air in the space 64 enters the four orifices 74 where it mixes and is entrained with the surfactant in the lifting pipe 66; the pressurized mixture of surfactant and entrained air then passes into the flow and line mixer 38. Upon entering the valve 22 and the inlet fluid expansion bore 25 at the bottom of the cup 6, the pressurized mixture of air and surfactant becomes depressurized down to atmospheric or ambient, thereby converting the mixture into the teat dip foam 26. If desired, water may be added to the surfactant to produce a desired foam consistency.

The foam produced by the apparatus and method of this invention is unique in terms of functioning as a bovine teat dip since it adheres to the teat and udder area without significant run off, and forms a bead at the end of the teat. This area of the teat is at significant risk to infection both prior to and subsequent to milking, and the presence of the bead considerably reduces the possibility of infection. Also, since there is little foam run off, a longer period of protection is afforded against bacterial infection. Moreover, following cessation of milking, use of a post-dip which is not wiped off, enables the open teat sphincter to be covered by the foam bead, when the open sphincter, and hence the teat canal is at high risk of infection.

A preferred teat cup of use in the present invention is shown in FIGS. 4–6, and illustrates a cow udder 80 and dependent teats 82. A teat apparatus 84 for washing and milk 'let-down' includes an upwardly opening cup 86 including a bottom wall 88 and open upper end 90. The bottom wall 88 includes a central inlet inlet fluid expansion bore 92 into which is fitted the outlet end of a nozzle 94, infra, for upwardly discharging foam. The nozzle 94 includes an actuating lever 96 and a surfactant flow and mixer line 98 which is coupled to the nozzle for continuously supplying cleaning foam to the cup.

The lower portion of the cup 86 includes a lateral outlet 100 about which the inlet end of a drain neck 102 and a closure cap 104 are secured, the drain neck including a downwardly projecting support 106 carrying a downwardly opening abutment 108 at its lower end against which the main body portion 110 of the nozzle 94 may be upwardly abutted.

The interior of the cup 86 is lined with a sleeve 112 of resilient material and the sleeve includes circumferentially and axially spaced groups of inwardly projecting flexible blade type elements 114 projecting radially inwardly from the outer periphery of the cup 86, and the open upper end 90 of the cup includes a circumferentially extending and outwardly projecting ridge 116. The blade type elements 114 are sized to be of greater length than width, and greater width than thickness.

An annular partial top wall 118 is provided and includes a down and in turned peripheral attaching snap fitting flange 120 over the upper end 124 of the cup 80, and the partial top wall includes a plurality of circumferentially and radially spaced axially projecting resilient fingers 121 which upwardly abuts the underside portions of the udder 80 immediately surrounding an associated teat 82.

During a cleaning operation, the central inlet expansion bore 92 is utilized to upwardly dispense cleaning foam into the bottom of the cup 86, and the foam not only contacts an associated centrally disposed teat 82, but also contacts and moves the blade elements 114. This movement causes the blade elements to vibrate or laterally oscillate, thereby performing a scrubbing action on the teat exterior.

Additionally, the resilient fingers 121 upwardly abut and stimulate those portions of the udder 80 immediately surrounding the upper base portion of an associated teat 82. Also, some of the upwardly directed foam from the nozzle 94 passes upwardly through the upper end 124 and further stimulates the udder, similar to the tongue of a nursing calf.

Another equally important function of the blade elements and fingers is to force and uniformly distribute the foam around and into contact with the immersed teat. Also, the blade elements and fingers force the foam upwardly to the top portion of the cup. Hence, any dirt on the teat is removed and forced upwardly by the foam to the top of the cup and then is discarded. This results in a very clean cup for succeeding foam dip applications in subsequent milking operations.

What is claimed is:

1. A system for producing a foam teat dip, comprising:
    a.) a container for supplying liquid surfactant and germicide to a teat cup;
    b.) a flow and mixer line including: a liquid lifting pipe connected to the flow and mixer line and positioned within the container, the liquid lifting pipe defining an entry port positioned within the container for entry of surfactant and germicide, and intake ports disposed on the liquid lifting pipe within the container for intake of air;
    c.) the teat cup being configured to surround a bovine teat and defining an open upper end adjacent an udder portion near the teat, the teat cup defining an inlet fluid expansion bore connected to the flow and mixer line for receiving a mixture of compressed air, surfactant and germicide;
    d.) the flow and mixer line being sized and constructed in conjunction with the inlet fluid expansion bore for supplying surfactant and germicide from the container, and entrained air under pressure from the air intake ports to the inlet fluid expansion bore of the teat cup; and,
    e.) a compressor for supplying air under pressure to the container, the compressor being adapted to:
        i. pressurize air within the container to force air, surfactant and germicide into the liquid lifting pipe;
        ii. mix pressurized air, surfactant and germicide in the connecting flow and mixer line;
        iii. forwarding the mixture of pressurized air, surfactant and germicide from the flow and mixer line to the inlet fluid expansion bore of the teat cup; and,
        iv. expanding the mixture of pressurized air, surfactant and germicide down to ambient pressure in the teat cup, thereby producing a foam inside the teat cup which adheres to the teat and adjacent udder portion.

2. The apparatus of claim 1, in which the compressed air is supplied to the flow and mixer line at about 20–50 psi.

3. The apparatus of claim 1, in which the teat cup defines an inner wall and an upper peripheral edge, the teat cup providing inwardly directed blade elements projecting from the inner wall for contact with a teat, and upwardly projecting fingers being disposed around the upper edge of the teat cup for contact with an udder portion of the cow adjacent to the teat, the blade elements being disposed to equalize the distribution of foam around the teat, and the udder portion adjacent the teat.

4. The apparatus of claim 1, in which the teat cup is arranged and constructed to centrally position the teat within the teat cup.

5. The system of claim 1, in which the inlet fluid expansion bore is about 1" inch in diameter, the flow and mixer line is at least 20 feet in length, and the pressure in the flow and mixer line is at least 20 psi, to thereby produce a foam in the teat cup from a mixture of air, surfactant and germicide.

6. A system for producing a teat dip foam in a teat cup for application to a teat disposed therein, and to an adjacent udder portion, comprising:
   a.) a container for supplying surfactant and germicide to the teat cup, an inlet fluid expansion bore being defined by the teat cup;
   b.) an air compressor for supplying compressed air;
   c.) a connection line from the inlet fluid expansion bore of the teat cup to the container of surfactant and germicide and to the source of compressed air, the connection line being sized in conjunction with the inlet fluid expansion bore to supply surfactant and germicide to the teat cup;
   the compressor being adapted for:
      i. supplying compressed air, surfactant and germicide from the container into the connection line;
      ii. mixing the compressed air, surfactant and germicide in the connection line;
      iii. forwarding the mixture of compressed air, surfactant and germicide from the connection line to the inlet fluid expansion bore at a pressure of at least 20 psi; and,
      iv. expanding the mixture of compressed air, surfactant and germicide from the inlet fluid expansion bore and into the teat cup, thereby forming a foam in the teat cup which adheres to the teat and adjacent udder portion.

7. The apparatus of claim 6, comprising a flow and line mixer for mixing the surfactant and germicide with the pressurized air, the flow and line mixer being connected to the inlet fluid expansion bore of the teat cup.

8. The apparatus of claim 6, in which the teat cup is arranged and constructed to centrally position the teat within the teat cup.

9. The apparatus of claim 6, in which the teat cup provides blade elements inwardly projecting from the teat cup at its outer periphery, the blade elements being disposed to equalize the distribution of teat dip foam around the teat, and the udder portion adjacent the teat.

10. The system of claim 6, in which the inlet fluid expansion bore is about 1" in diameter, the flow and mixer line is at least 20 feet in length, and the pressure in the flow and mixer line is at least 20 psi, to thereby produce a foam in the teat cup from a mixture of air, surfactant and germicide.

* * * * *